E. J. RIMPLE AND J. W. MORGAN.
GANG PLOW.
APPLICATION FILED JULY 28, 1920.
1,401,496.
Patented Dec. 27, 1921.
3 SHEETS—SHEET 1.
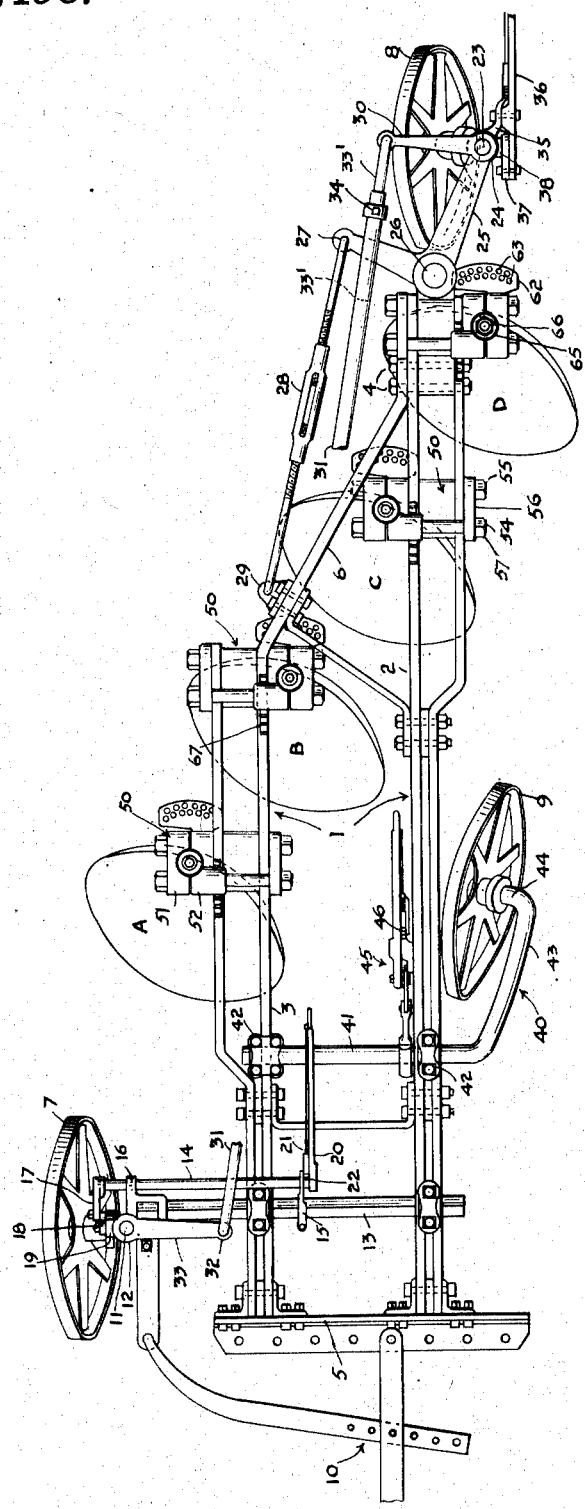
INVENTOR
E. J. RIMPLE
J. W. MORGAN
BY
ATT'YS.

E. J. RIMPLE AND J. W. MORGAN.
GANG PLOW.
APPLICATION FILED JULY 28, 1920.
1,401,496.
Patented Dec. 27, 1921.
3 SHEETS—SHEET 2.
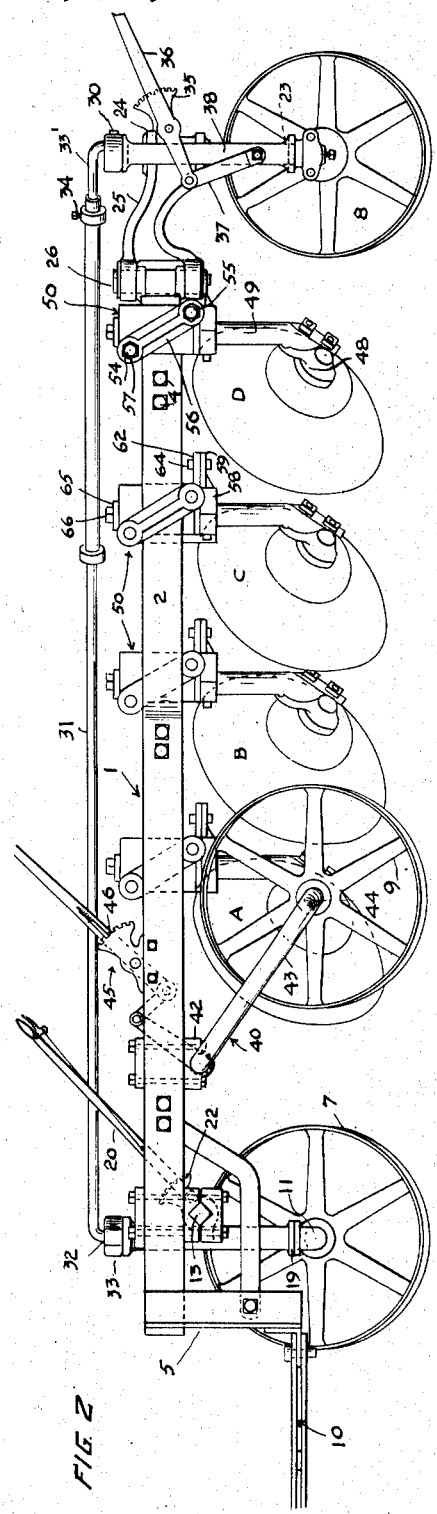
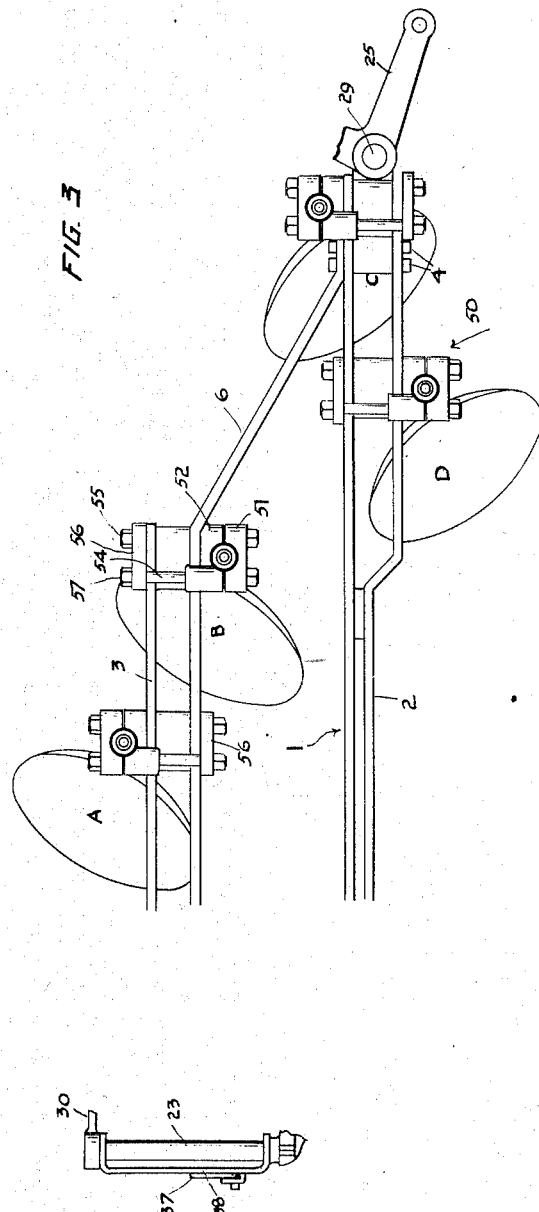
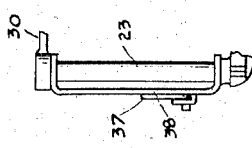
INVENTOR
E. J. RIMPLE
J. W. MORGAN
ATT'YS.

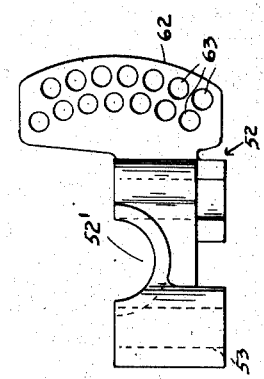
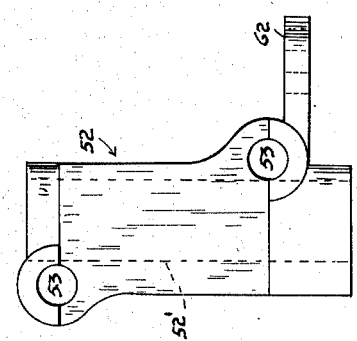
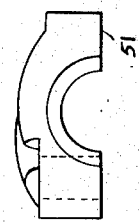
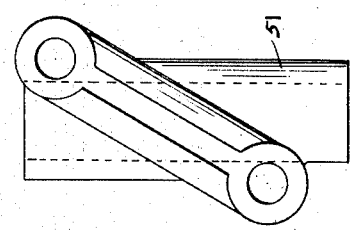
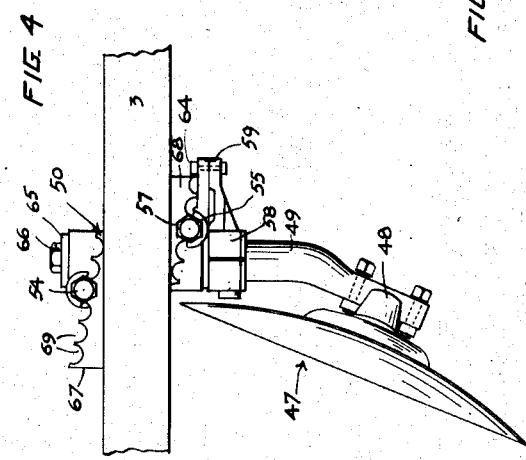
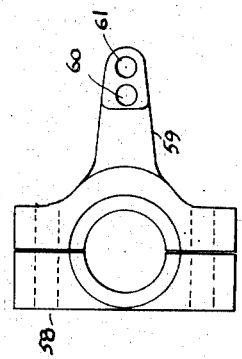
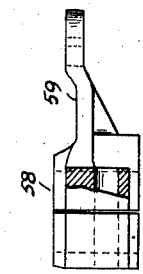

UNITED STATES PATENT OFFICE.

EDWARD J. RIMPLE AND JOHN W. MORGAN, OF SAN JOSE, CALIFORNIA.

GANG-PLOW.

1,401,496.   Specification of Letters Patent.   Patented Dec. 27, 1921.

Application filed July 28, 1920. Serial No. 399,530.

*To all whom it may concern:*

Be it known that we, EDWARD J. RIMPLE and JOHN W. MORGAN, citizens of the United States, residing at San Jose, in the county of Santa Clara and State of California, have invented new and useful Improvements in Gang-Plows, of which the following is a specification.

This invention relates to improvements in agricultural implements of the disk plow type.

The primary object of this invention is to provide a plow of the character described in which certain operating parts are arranged so that they may be adjusted to provide a vineyard plow, a checker or ditcher and otherwise so that more effective plowing of land under various soil and crop conditions may be provided with the one implement.

An object of the invention is to provide a plow of the character described which is relatively simple and inexpensive as to construction, strong, durable, and in which adjustment of the plow disks or other implements and coöperating plow parts may be easily and quickly effected to render the plow best suited for working in soil in anyone of its various conditions and for plowing in cover crops and other high vegetation.

The invention possesses other advantages and features, some of which with the foregoing will be set forth at length in the following description wherein we shall outline in full that form of the invention which we have selected for illustration in the drawings accompanying and forming a part of the present specification. In said drawings, we have shown one form of the construction of our invention, but it is to be understood that we do not limit ourselves to such form, since the invention as expressed in the claims may be embodied in a plurality of forms.

Referring to the drawings:

Figure 1 is a top plan view of the plow of our invention showing it arranged for general plow usage.

Fig. 2 is a side elevation of the plow as shown in Fig. 1.

Fig. 3 is a fragmentary top plan view of the plow arranged for use as a vineyard plow.

Fig. 4 is a detail fragmentary side elevation of one of the disks and means for adjustably mounting the disks upon the plow frame.

Fig. 5 is a top plan view of a part of one of the clamping devices.

Fig. 6 is a side elevation of one of the parts of the clamping device.

Fig. 7 is a top plan view of another part of the clamp.

Fig. 8 is a side elevation of the part of the clamp shown in Fig. 7.

Fig. 9 is a top plan view of a detail of the clamp.

Fig. 10 is a side elevation partly broken away and in section, of the detail shown in Fig. 9.

Fig. 11 is a fragmentary side elevation of a detail of the invention.

Referring to the present embodiment of the invention as illustrated in the drawings, there is provided a main frame 1 which consists essentially of two plow beams 2 and 3 joined at their rear ends by bolts 4 and connected at their forward ends by a cross frame piece 5. The beams 2 and 3 extend for the most part parallel to one another. Adjacent to its rear end the beam 3 is converged as at 6 so as to permit of connection of the rear end of said beam with the beam 2.

The main frame supports the ground working implements which will be later more fully described. To provide for the movement of said implements into and out of position for operation and to regulate the depth of operation of said implements, the frame is vertically adjustably supported upon running gear. The running gear comprises a front furrow wheel 7, a rear furrow wheel 8 and a land wheel 9. Suitable draft rigging 10 is operatively associated with the cross frame piece 5 and the front furrow wheel 7. The front furrow wheel 7 is rotatably mounted upon a vertical axle 11, which axle is rotatably journaled in a suitable bearing 12 therefor. The bearing 12 is supported by a bar 13, which bar is rigidly secured to, extends transversely and projects outwardly to one side of the frame. The lower end of the axle 11 is angularly disposed whereby the wheel 7, instead of standing vertically, leans or is inclined outwardly to the right. The purpose of this is to compensate for the side or lateral thrust tendency provided by the working of the ground implements in the soil. The axle 11 is slidable vertically through the bearing 12 therefor whereby the frame is vertically adjustable relative to the axle. To provide for such adjustment of the frame at this point, a horizontal shaft 14 is journaled in suitable bearings 15 and 16 therefor on the bars 13 and bearing 12 respectively. A crank arm 17 is attached rigidly to the outer end of the shaft 14. This crank arm is pivotally connected by means of a link 18 with a bracket 19 which is secured at its ends rigidly but rotatable to the axle 11 at points above and below the bearing 12. The shaft 14 is arranged to be rotated by a lever 20 fixed to the inner end of the shaft and provided with suitable lever locking mechanism 21, which mechanism cooperates with a notched quadrant 22. By properly manipulating the lever 20 the shaft is rotated so that a pull or push is communicated to the arm 17, link 18 and bracket, whereby the frame 1 will be lifted or lowered, depending upon the operation of the shaft 14, relative to the vertical axle. This arrangement is similar to that provided in the ordinary plow and need not be described in detail.

The rear furrow wheel 8 is rotatably mounted upon the lower end of a vertical axle 23 journaled for rotation and vertical movement in a suitable bearing 24 provided in one end of a bell crank 25. The bell crank 25 is pivoted as at 26 to the rear end of the frame 1. The lower end of the axle 23 is angularly disposed whereby the wheel 8 is inclined and leans outwardly in correspondence to the inclination of the front wheel 7 and for the same purpose. The other end of the bell crank 25 is pivotally connected as at 27 with a turn buckle 28, the latter being secured as at 29 to an intermediate point on the plow beam 3. By manipulating the turn buckle 28, the bell crank is rocked, whereby the wheel 8 is moved in an arc. When the wheel is moved to the right wider cuts are made, whereas when the wheel is moved to the left, narrower cuts are made, both as compared to cuts as made when the wheel travels in direct line with the direction of travel of the plow. By this arrangement, the wheel can be set to travel at any angle desired relative to the line of travel of the plow.

To provide for the tracking of the rear furrow wheel so as to facilitate the steering of the plow on sharp turns and in narrow places, the upper end of the shaft 23 has a crank arm 30 fixed thereto. The crank arm 30 is connected with a reach rod 31, the forward end of which rod is connected as at 32 to a steering arm 33 which latter is fixed to the upper end of the shaft 11. The reach rod 31 is provided with an extensible portion 33' whereby the rod may be lengthened or shortened. The extensible portion 33' is adapted to be locked in position by a set screw 34 arranged in the customary manner. When the front wheel 7 is turned in one direction, the rear wheel 8 is moved in the opposite direction through the connection provided by the reach rod and associated parts. This facilitates the steering of the vehicle as hereinbefore explained.

To provide for raising and lowering of the rear end of the plow relative to the axle 23, the bearing 24 is formed with an extension 35 on which extension a lever 36 is pivoted. The lever 36 is connected by a suitable link 37 with a bracket 38, which latter is fixed to the shaft 23 after the manner of the bracket 19. By manipulation of the lever, the frame at the rear may be raised or lowered relative to the shaft. In all other respects, this mechanism is similar to that employed in connection with the front wheel and it is thought unnecessary to describe this in detail.

The land wheel 9 is provided with an axle 40, a horizontal portion 41 of which is rotatably journaled in suitable bearings 42 transversely of and upon the frame 1. Extended from the horizontal portion of the axle is an outwardly, downwardly and rearwardly projecting portion 43 which, at its lower end, terminates in an inwardly, downwardly and rearwardly extending portion 44. The portion 44 supports the wheel 9 and by this arrangement, the wheel is normally supported in an inclined position corresponding somewhat to the inclination of the wheels 7 and 8, but this wheel is set at an angle to the line of travel of the vehicle, being extended inwardly and forwardly. This disposition of the wheel compensates materially for the side thrust tendency of the plow.

The raising and lowering of the frame relative to the land wheel is effected by rotating the horizontal portion 41 of the axle 40. This is effected by the lever and link arrangement generally designated 45. The lever is provided with lever locking mechanism 46. This mechanism for turning the shaft is somewhat like that employed for the front and rear wheels and need not be described in detail. When the shaft is rotated so as to lift the wheel 9 upwardly, the frame is lowered, whereas movement of the shaft in the opposite direction causes the frame to be raised. As the frame is lowered, the land wheel assumes a greater angle to the line of travel and thus offers more resistance to the greater side movement tendency, which is produced as the implements dig deeper into the soil. As the frame is raised, the land wheel comes to a position nearly in line with the direction of travel so as to be substantially straight and upright, whereby when the plows are not digging the vehicle will run more freely over the ground. The ground working implements carried by the plow beams 2 and 3 is this embodiment of the invention comprise a plurality of disk plows, there being four shown. Other types of ground working implements, if desired, may be used, but I have found that the disk plows are best suited for the purposes of this agricultural implement.

For the sake of convenience in describing the plow arrangement, the plows will be designated A, B, C, and D. These plows are concavo-convex as is customary and each is rotatably mounted upon suitable journal means 48 upon the lower end of a plow standard 49. Each plow standard 49 is inclined forwardly and slightly to one side at its lower end, whereas the major portion thereof is substantially vertical. Each plow standard is provided with means for adjustably and removably connecting it with the plow beam, the means being so constructed as to provide for adjustment of the plow disk in an arc forwardly and rearwardly for vertical adjustment thereof, for bodily longitudinal movement relative to the plow beam and for rotation of the plow disks upon the axis of the standards. This means comprises for each plow disk a clamp generally designated 50 and which is removably and slidably mounted upon the plow beam. The clamps are arranged so that they may be attached upon various points of the frame or plow beams whereby the implement may be operated as an ordinary plow or for other purposes as will be hereinafter described. Each clamp 50 comprises jaw members 51 and 52 in the form of castings. Each jaw member is provided on one face with a vertical semi-circular groove 52' whereby when the clamp members are brought together, an opening is provided for reception of the standard 49. Extending transversely through each clamp member adjacent to the upper and lower ends thereof are openings 53 for the reception of bolts 54 and 55. These bolts extend above and below the plow beams and at their ends are connected with the upper and lower ends of a clamp member 56 being inserted through openings in the ends of said clamp member. The clamp members 56 engage certain sides of the plow beams and the clamp members 50 are held in clamping relation upon opposite sides of the plow beam, by the bolts 54 and 55. The bolts 54 and 55 have nuts 57 turned upon their threaded ends. By taking up on the bolts, the clamp members 51 and 52 are brought into clamping engagement with the plow standards and the clamping devices 50 are tightly clamped upon the plow beam. With the plow standard thus held in position, it will be seen that the plow disk standard and clamps may be moved backwardly and forwardly upon the plow beam. The plow disk may be readily removed from the standard by loosening the bolts 54 and 55 whereby the clamping members 50 and 51 will release the plow standard.

To provide for locking the disks in adjusted position, there are provided castings 58 fixedly secured to the standards beneath the plow beams. Each casting 58 has a projection 59 extending outwardly from one side thereof, the projection being provided with two openings 60 and 61. Formed integral with the lower end of each member 52 is a lateral extension 62 provided with two series of arcuately arranged openings 63, with which openings the openings 60 and 61 are adapted to register. When the standard has been rotated to the desired degree so as to dispose the plow disk in the desired position, a bolt 64 is inserted through registering openings 61 and 63 so as to lock the plow standard against rotative movement The upper end of the plow standard has a washer 65 held in place thereon by a screw bolt 66, the washer being larger than the opening provided through the clamp members and engaging the upper surfaces of the clamp members 51.

To provide for movement of the disk plow and standard 49 forwardly and rearwardly bodily in an arc, there are provided wedge members 67 and 68 disposed upon the upper and lower sides of the plow beams, there being two such members for each clamp 50. The upper or outer surface of each member is provided with a series of notches 69. The wedge shaped members are arranged with their smaller ends inwardly disposed and the bolts 54 and 55 engaged in certain of the notches 69 of said members 65 and 66. As the bolts 54 and 55 are spaced considerably above and below the plow beams and are located out of alinement with one another, by moving, for example, the upper wedge member 67 inwardly and the lower member 68 inwardly, the clamp 50 will be inclined forwardly and downwardly whereby the standard 49 and plow disk will be moved forwardly and upwardly and cause the plow disk to have a greater rearward inclination. Opposite manipulation of the members 67 and 68 will allow the plow disk to be set at an angle substantially vertical. In this way, the plow disk may be moved in an arc, rearwardly and forwardly, whereby it may be set in position best suited for the particular kind of ground working or plowing desired to give proper "suction" of the disks.

As shown in Fig. 1 of the drawings, the agricultural implement is set up to operate as an ordinary gang plow of the disk type, the disks A, B, C, and D being arranged one behind the other in the customary manner. These disks may be raised or lowered relative to the ground by manipulating the means for lowering or raising the frame, said means being the levers 20, 45 and 36 and their associated mechanisms hereinbefore described. These disks may also be adjusted as to their position relative to one another by manipulation of the clamp means 50 after the manner described. By having the clamp members 50 relatively longitudinally adjustable upon the plow beams, the disks may be set at relative distances apart as best suited.

When it is desired to change the agricultural implement into a checker or ditcher as shown in Fig. 3 of the drawings, the two rear disks C and D are reversed as to their positions, except as a checker, the two center disks B and C being removed. The clamp 50 for the rear disk D is moved into the approximate position of the clamp 50 for the disk C and the clamp 50 for the disk C is moved into the position of the clamp for the disk D, the clamps, however, being disposed on opposite sides of the plow beams as compared to their arrangement when the implement is set up as an ordinary plow. This provides two plow disks facing one side of the implement and two the other side. With the plow disks thus arranged, the plow may be operated effectively as a checker or ditcher. Various other relative adjustments of the plow disks or ground working implements are provided by reason of the adjustable clamping means for securing the disks to the plow beams.

Each plow disk is movable in an arc on the axis of the plow standard sufficiently to permit of the use of the disk for various ground working purposes and the character of the furrow or ditch to be made on the ground may be varied as desired by adjusting the plow disks in this way and radially and by moving them forwardly or backwardly as desired in an arc bodily.

It will thus be seen that I have provided an agricultural implement consisting of relatively few parts of simple construction in which the parts may be adjusted in a comparatively short time to render the implement suitable for ordinary plowing purposes, for use as a checker or ditcher, for use as a cover crop plow, vineyard plow, and for use for other ground working purposes.

The plow frame, as before stated, comprises two parallel beams 2 and 3 spaced apart and extending longitudinally of the frame. As the ground working implements are longitudinally adjustably mounted upon said beams, it is possible to vary the space between the implements without changing the width at which the plows are spaced apart. This will give clearance between the implements so that when working in high vegetation, sufficient space is provided between the plows to prevent clogging of the oil and vegetation between the plows, without necessitating the changing of the width of the cut.

I claim:

1. An agricultural implement comprising a frame, wheels supporting the frame, a plurality of ground working implement members mounted for longitudinal adjustment forwardly and rearwardly upon said frame, stems on said implements, means for rotatably securing said stems to said members and means for inclining said members relative to the frame whereby inclination of the implements may be varied.

2. An agricultural implement comprising a frame, a member bodily adjustable upon the frame, a ground working implement, a stem extending upwardly from said implement, means for rotatably connecting said stem with said member and means for bodily changing the inclination of said member relative to the frame whereby the inclination of the implement may be varied.

3. An agricultural implement comprising a frame having parallel ground implement supporting beams, wheels supporting the frame and a plurality of ground working implements relatively longitudinally adjustably mounted upon said beams, whereby the space between implements may be varied without changing the width of the cut made by the implement.

4. In an agricultural implement, a frame, wheels supporting the frame, ground working implements supported by the frame, and means providing for varying the spaces longitudinally between said implement without necessitating changing the spaces transversely between the implements.

5. An agricultural implement comprising a frame, parallel beams on said frame and ground working implements longitudinally adjustably and interchangeably mounted upon said parallel beams and arranged whereby said longitudinal adjustment may be accomplished without necessitating removal of the implements from the beams nor the changing of the space or distance transversely between said implements.

6. An agricultural implement comprising a frame, wheels supporting the frame, a ground working implement, an upright standard for said implement, a clamp in which said standard is rotatably mounted, and means for securing said clamp to the frame arranged to permit arcuate adjustment of said clamp in a vertical plane.

7. An agricultural implement, comprising a frame, wheels supporting the frame, a ground working implement, and means for securing said implement to the frame arranged to permit of longitudinal adjustment of the implement relative to the frame and to permit of arcuate adjustment of the implement forwardly and rearwardly in a vertical plane, and arcuate adjustment transversely.

8. An agricultural implement comprising a frame, wheels supporting the frame, a ground working implement, a standard carried by said implement, clamping members between which said standard is rotatably held, bolts extending through said clamping members, a clamping member with which said bolts are connected at certain ends, said first-named and last-named clamping members being disposed on opposite sides of the frame and clampingly engaging said part of the frame and means for changing the angle of the clamping members relative to the frame to vary the position of the ground working implement.

9. An agricultural implement comprising a frame, wheels supporting the frame, a ground working implement, an upright standard fixed to said implement, clamping members between which said standard is rotatably held, bolts extending through said clamping members and disposed above and below a part of the frame, a clamping member with which said bolts are connected at certain ends, said first-named and last-named clamping members being disposed on opposite sides of the frame and clampingly engaging said part of the frame, and means for changing the angle of the clamping members relative to the frame to vary the position of the ground working implement, said means comprising wedge-shaped members inserted from opposite sides of and adapted to engage between the frame and said bolts.

10. An agricultural implement comprising a frame, wheels supporting the frame, a ground working implement, an upright standard carried by said implement, two clamping members mounted upon and engaged with one side of the frame and between which said standard is rotatably held, another clamping member engaged with the frame, bolts extending above and below the frame and connected with said clamping members to hold them upon the frame and adjustable wedge-shaped members interposed between and engaging said bolts and the upper and lower sides of the frame.

11. An agricultural implement comprising a frame, a front furrow wheel attached to said frame, a land wheel attached to the frame, a rear furrow wheel, means supported upon and being movable transversely of the frame for supporting said rear furrow wheel, a steering connection between the rear furrow wheel and front furrow wheel, and an adjusting device operatively associated with the frame and said means for supporting the rear furrow wheel and arranged to move said first named means and change the position of said rear furrow wheel when adjusted.

12. An agricultural implement comprising a frame, a front furrow wheel operatively associated with the frame, a land wheel connected with the frame, a member supported on the frame and having one end movable in an arc transversely of the longitudinal axis of the frame, an axle supported by said member, a rear furrow wheel mounted upon said axle, a turn buckle device connected with said member and frame for effecting adjustment thereof relative to the frame and steering means associated with said rear and front furrow wheels.

13. An agricultural implement comprising a frame, a front furrow wheel connected with the frame, a rear furrow wheel, a land wheel, an axle having a horizontal portion rotatably mounted in the frame and extending transversely thereof, one end of said horizontal portion being extended rearwardly, downwardly and outwardly and then extended inwardly, downwardly and rearwardly, a land wheel mounted upon the last-named portion of said axle, and means for rotating the horizontal portion of said axle to change the position of the land furrow wheel relative to the frame.

14. An agricultural implement comprising a frame, a front furrow wheel connected with the frame, a rear furrow wheel connected with the frame, a plurality of working implements carried upon the frame, said frame being capable of being raised and lowered relative to these supporting wheels to vary the depth of the digging of said implements and a ground wheel connected with the frame and having means which as the implements dig deeper into the soil causes the wheel to automatically assume a greater inclination to the line of travel and offer increased resistance to the increased side movement tendency of the agricultural implement.

15. An agricultural implement comprising a frame, ground working implements carried upon the frame, a front furrow wheel and a rear furrow wheel both connected with said frame and means including a ground wheel which, when, the implements dig deeper into the soil will cause said ground wheel to run at an increasing inclination to the line of draft so as to increase the resistance against the side swaying tendency of the agricultural implement.

16. An agricultural implement comprising a frame, ground working tools supported on the frame, a front furrow wheel and a rear furrow wheel, means including a land wheel for raising and lowering the frame to regulate the depth of operation of said tools which means provides for automatically increasing the angle which the land wheel sets and runs relative to the line of draft so as to increase resistance against side swaying when the frame is lowered and the tools dig deeper into the soil.

EDWARD J. RIMPLE.
JOHN W. MORGAN.